United States Patent [19]

Hattori

[11] 4,438,954

[45] Mar. 27, 1984

[54] PIPE COUPLING

[75] Inventor: Tadashi Hattori, Kishiwada, Japan

[73] Assignee: Isuzu Kogyo Kabushiki Kaisha, Osaka, Japan

[21] Appl. No.: 325,124

[22] Filed: Nov. 27, 1981

[30] Foreign Application Priority Data

Mar. 26, 1981 [JP] Japan .................................. 56-44619

[51] Int. Cl.³ .............................................. F16L 17/02
[52] U.S. Cl. ..................................... 285/104; 285/111;
285/197; 285/321; 285/369; 285/383; 285/404
[58] Field of Search ............... 285/369, 404, 414, 340,
285/104, 111, 197, 321, 383

[56]  References Cited

U.S. PATENT DOCUMENTS

| 817,300 | 4/1906 | David | 285/369 |
| 3,420,554 | 1/1969 | Straub | 285/340 X |
| 3,920,270 | 11/1975 | Babb | 285/369 X |
| 3,941,410 | 3/1976 | Miyaoka | 285/404 X |
| 4,304,424 | 12/1981 | Horsen | 285/404 |

FOREIGN PATENT DOCUMENTS 1475860 3/1969 Fed. Rep. of Germany ...... 285/369

Primary Examiner—Dave W. Arola
Attorney, Agent, or Firm—Birch, Stewart, Kolasch & Birch

[57] ABSTRACT

In a pipe coupling for connecting pipes as fluid conduits, a split clamping ring, which is of arcuated configuration in cross section, has a pair of spaced circular sharp edges directed toward the pipe for firm engagement therewith and is disposed in an annular groove formed internally of a body so as to be slightly displaceable relatively to the groove in an axial direction of the body when a certain axial force is applied to the pipe; a deformable sealing ring is disposed in another annular groove formed internally of the body; and a plurality of depressing members are provided for adjustably compressing the clamping ring diametrically.

9 Claims, 14 Drawing Figures

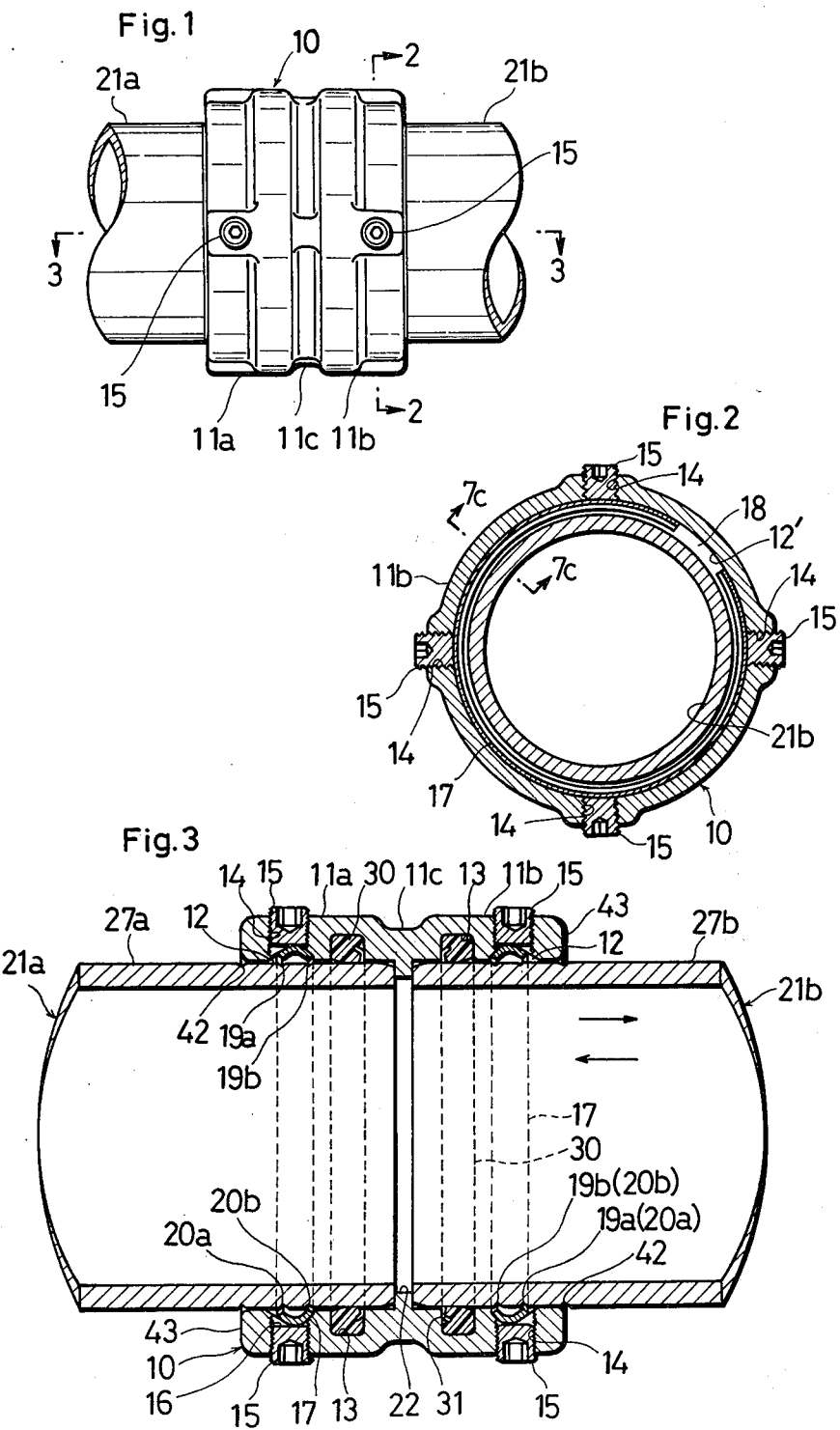

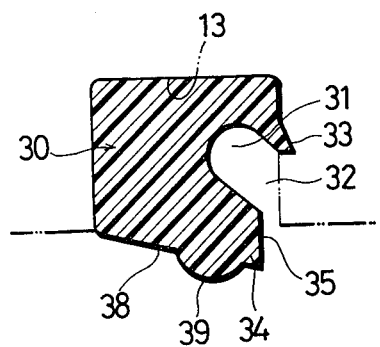
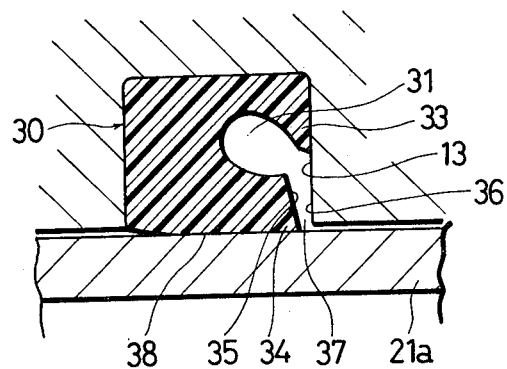
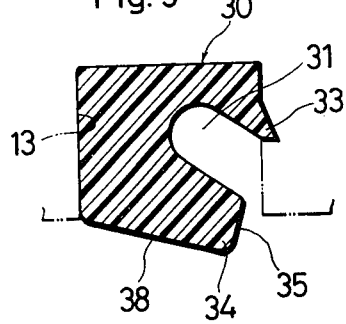
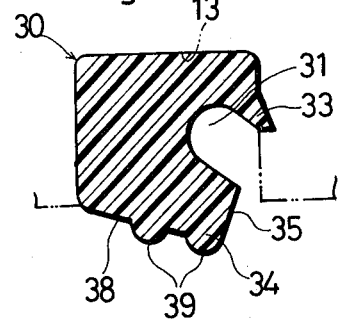
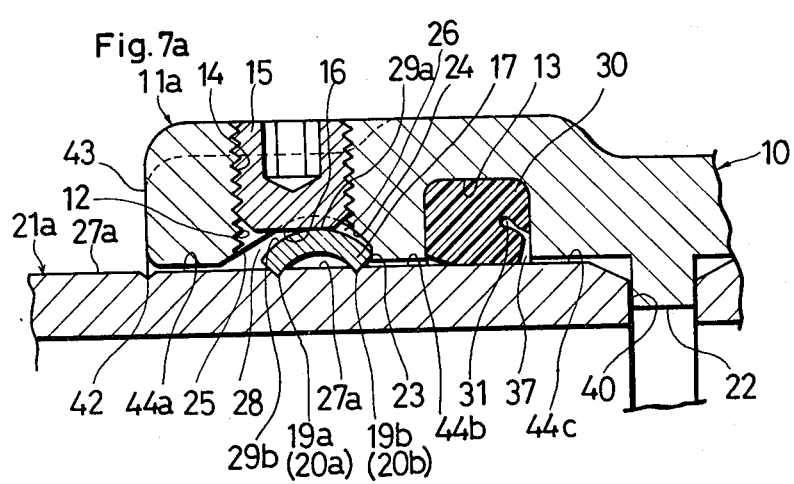

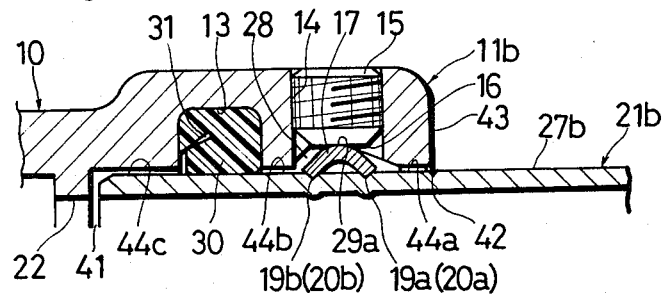
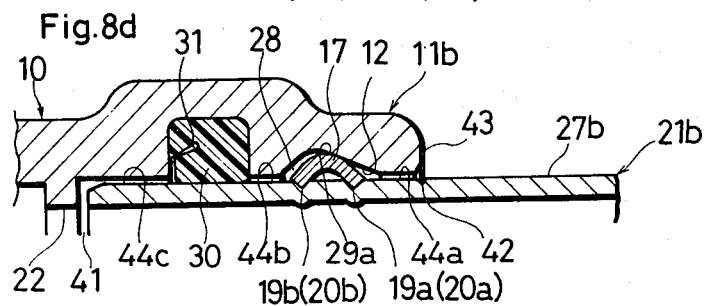
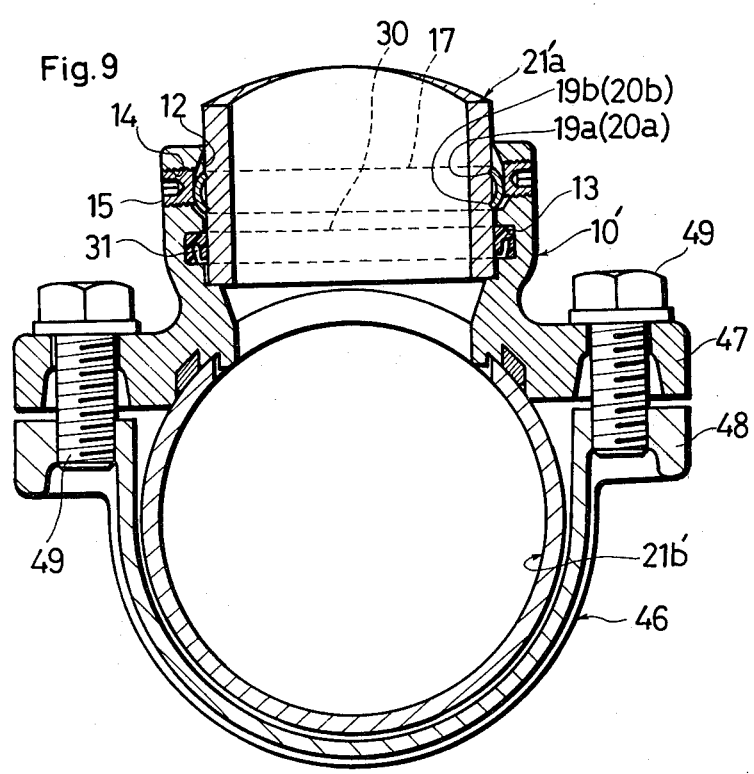

PIPE COUPLING

BACKGROUND AND SUMMARY OF THE INVENTION

This invention relates to a pipe coupling for connecting and sealing a joint between a pair of pipes as fluid conduits, and more particularly, to the coupling of the type as advantageously designed for automatically preventing excessive relative displacement or disconnection between a pair of connected pipes while maintaining a good sealing effect.

The joint between a pair of connected pipes is affected by various factors, that is, internal factors such as change in pressure or temperature of fluid which flows through the pipes, and/or external factors such as axial or torsional forces or transversal oscillations caused for example by earthquake. These factors occasionally cause displacement or disconnection between the jointed pipes.

For the purpose of producing and maintaining interconnection between a coupling body and the pipes, a combination of clamping pieces with cooperating clamping bolts or screws is utilized in one form of the conventional pipe couplings, as disclosed in Japanese Utility Model Application No. 41-105135 (Publication No. 45-7260, published Apr. 8, 1970). This type of conventional device comprises a plurality of spaced-apart cylindrical clamping pieces each embedded in and extending radially of an annular coupling body so as to be slidable within a certain limited range in the direction toward the center of the pipe, and a plurality of cooperating clamping bolts each supported by the coupling body and having a threaded shank extending coaxially of an associated clamping piece, so that, when the clamping bolt is tightened or turned, the bolt end forcibly pushes the associated clamping piece to slide axially thereof, resulting in that the serrated end wall of the clamping piece is pressed against the circumferential wall of the pipe in order to frictionally prevent undesirable relative displacement of the pipe. However, because of the above-discussed particular construction, this prior art device is, in fact, not so satisfactory not only in performing the expected interconnecting function but also in preventing damage to the pipes occurring when a considerably great axial force or a twisting force is applied to the joint between the pipes.

For the same purpose as mentioned above, a combination of a clamping ring with a plurality of clamping bolts or screws is utilized in another form of the conventional pipe couplings, as disclosed in Japanese Utility Model Application No. 47-79013 (Publication No. 54-24326, published Aug. 17, 1979), in which a split clamping ring is mounted on one of the pipes, so that, as the plurality of screws are tightened, the clamping ring, which is engaged with the screws, is compressed diametrically and pressed against the circumferential wall of the pipe. However, because the internal circumference of the ring, which is in tight contact with the circumferential wall of the pipe, has a smooth surface, the ring cannot hold its position relative to the pipe but is forced to axially slide on the circumferential wall of the pipe when a considerably great axial force is applied to the pipe.

It is, therefore, an object of the invention to eliminate the above discussed disadvantages in the conventional devices.

Another object is to provide an improved pipe coupling which is capable of producing and maintaining a firm interconnection between a pair of jointed pipes in response to changes in internal and/or external forces applied thereto.

A further object is to provide an improved pipe coupling which is simple in profile and good in appearance with less projections or protrusions.

A further object is to provide an improved pipe coupling which is very simple in construction with minimized number of parts and permits manufacture and maintenance at a low cost.

A still further object is to provide an improved pipe coupling having such a structure that permits an easy assemble with a deformable and self-sealing type sealing ring.

A yet further object is to provide an improved pipe coupling which is easy to handle and install at a job site and promotes efficiency in pipe connecting work.

Other object, features and advantages of the invention will become more fully apparent from the detailed description given hereinafter in connection with the accompanying drawings. It should be understood, however, that the detailed description and specific examples, which indicate preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 is a front elevation of one embodiment of the pipe coupling according to the invention shown in the installed position;

FIG. 2 is a slightly enlarged section taken along the lines 2—2 of FIG. 1;

FIG. 3 is an enlarged section taken along the lines 3—3 of FIG. 1;

FIG. 4a is an enlarged section of one example of a deformable sealing ring which is incorporated with the coupling body but not in the sealing position;

FIG. 4b is a similar view to FIG. 4a, but showing the sealing ring in the sealing position;

FIGS. 5 and 6 are similar views to FIG. 4a, but showing modifications of the sealing ring of FIG. 4a;

FIG. 7a is an enlarged view showing in detail a part of FIG. 3, in which the pipe is in the normal installed position;

FIGS. 8a to 8d are fragmental sections showing the manner of installation, in which FIG. 8a shows the pipe in the half-inserted position; FIG. 8b shows the pipe in the fully-inserted but non-clamped position; and FIGS. 8c and 8d illustrate the pipe in the fully-inserted and clamped position; and FIG. 9 is a sectional view showing another embodiment of the invention.

DESCRIPTION OF THE PREFERRED EMBODIMENTS

Figure 7B:
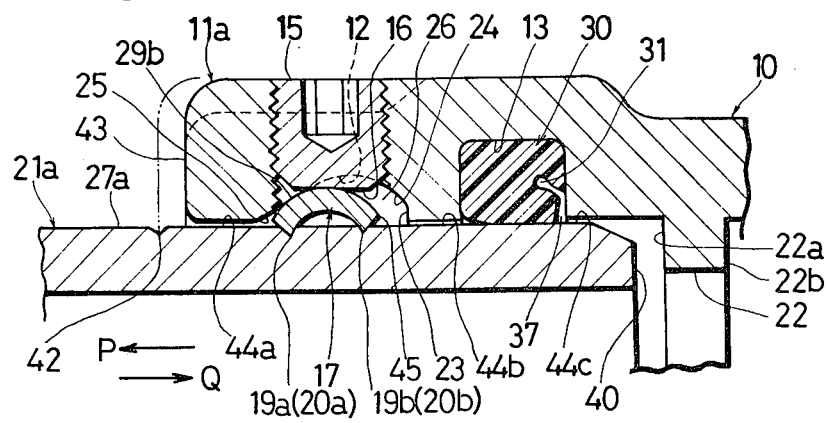
FIG. 7b is a similar view to FIG. 3a, but showing the position where the pipe has been moved in axially outwardly.

Referring in detail to the drawings with particular reference to FIGS. 1 to 8d, a coupling body 10 of a substantially cylindrical form is illustrated as having a first half section 11a and a second half section 11b connected integrally at an intermediate position 11c. The two sections 11a,11b may be symmetrical in construction, each of which has a first internal annular groove 12 and a second internal annular groove 13 both formed in the internal cylindrical wall thereof and spaced apart from each other, as illustrated. Each of the sections 11a,11b further includes a plurality of holes, for example four screw holes 14 each extending radially inwardly of the body 10 to intercommunicate with the first internal annular groove 12. A depressing member, preferably a screw, and more preferably a hexagon socket head screw 15, is engaged with each of the screw holes 14, so that the screw end 16 can extend into the groove 12 when the screw 15 is screwed up.

The axial length of each of the hexagon socket head screws 15 may preferably be so predetermined that the top of the screw does not project out of the hole 14 as long as the screw 15 is fully screwed up. It is also preferable to paint the screw shank in bright color, so that an operator can easily recognize that the screw 15 has not yet been fully screwed up.

In the first annular groove 12 is disposed a split clamping ring 17 which is made of elastic metal, for example, stainless steel, and split at one position 18 as shown in FIG. 2. The external diameter of the ring 17 should be at least greater than the internal diameter at 12' (FIG. 2) of the two sections 11a,11b, but can be reduced when compressed diametrically. The ring 17 can be snapped into the groove 12. The clamping ring 17 is of substantially arcuated or inverted-V-shape configuration in cross section and illustrated as having a pair of circular sharp edges 19a,19b which are directed radially inwardly of the cylindrical body 10 and axially spaced apart from each other so as to be engaged with a pair of axially spaced V-shaped grooves 20a,20b preferably formed in the outer circumferential walls 27a,27b of the opposed end portions of a pair of pipes 21a,21b, respectively. The V-shaped grooves 20a,20b may be omitted if the pipes 21a,21b are of soft metal.

The coupling body 10 may preferably be formed at intermediate position 11c with an internal annular flange 22 which extends radially inwardly of the body 10 so as to serve as a stopper for restricting an excessive axially inward displacement of the pipes 21a,21b.

Figure 7C:
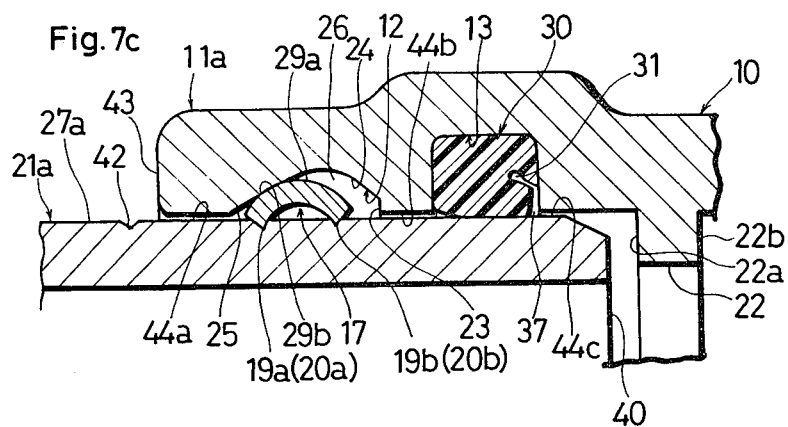
FIG. 7c is an enlarged, fragmental section taken along the lines 7c—7c of FIG. 2, but showing the same position as in FIG. 7b.

The first groove 12 is defined by an innermost annular wall 23 (FIGS. 7b,7c), an intermediate annular wall 24 (FIGS. 7a to 7c) and an outermost tapered wall 25 (FIGS. 7a to 7c). The innermost wall 23 is disposed innermost of the body 10 and extends substantially vertically. The intermediate wall 24 is interposed between the innermost wall 23 and the outermost wall 25 and has a substantially arcuated profile in cross section. The outermost wall 25 is tapered down at an angle between 20° to 40°, preferably 30°, as it extends toward an opening mouth of the body 10.

Figure 8A:
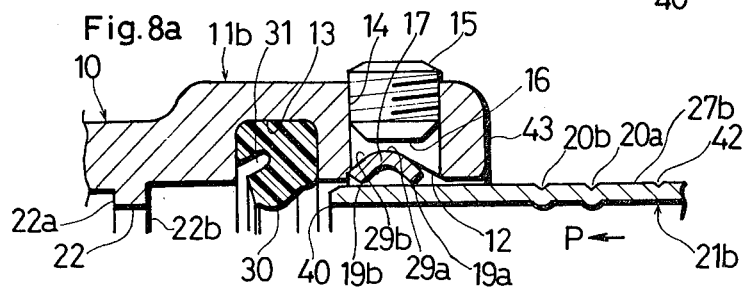

As illustrated in FIGS. 7a to 7c, an annular space 26 defined by the walls 23, 24, 25 and the cylindrical outer wall 27a (FIGS. 7a to 7c) or 27b (FIGS. 8a and 8b) of the pipes 21a,21b should be so formed that, when the clamping ring 17 is disposed in the normal installed position within the groove 12, as shown in FIGS. 7a, 8c and 8d, an annular gap 28 (FIGS. 7a and 8c) is provided between the tapered outermost wall 25 and an inclined wall 29b of the arcuated circumference of the ring 17.

In the second annular groove 13 is disposed a deformable sealing ring 30 which is formed of elastic material such as rubber and has an annular cavity 31 whose opening 32 (FIG. 4a) is directed axially inwardly of the coupling body 10. As illustrated in FIGS. 4a and 4b, the sealing ring 30 has a pair of easily deformable annular lips, that is, an outer lip 33 and an inner lip 34 formed adjacent the opening 32. The inner lip 34 has a substantially vertically extending annular wall 35 which cooperates with an innermost annular wall 36 (FIG. 4b) of the groove 13 so as to provide a fluid passage 37 therebetween when the sealing ring 30 is in sealing position as illustrated in FIG. 4b. The inner lip 34 further includes an internal circumferential wall 38 which is tapered and bulged out of the groove 13 when the sealing ring 30 is in non-sealing position as shown in FIGS. 4a, 5 and 6 but deformed so as to extend in parallel with the outer cylindrical walls 27a,27b of the pipes 21a,21b. The wall 38 may preferably be formed with an annular rib or protuberance 39 for increasing density or rigidity of the lip 34 when deformed as shown in FIG. 4b. The rib 39 also contributes to preventing the ring 30 from unexpectedly slipping out of the groove 13. However, the rib 39 may be omitted as illustrated in FIG. 5, or otherwise, two or more ribs 39 may be formed as shown in FIG. 6.

Figure 8B:
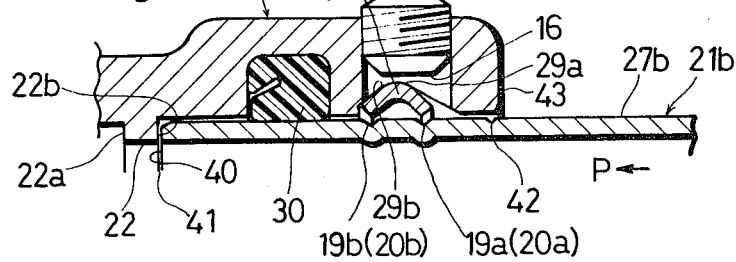

In order to install the pipe coupling onto the joint of a pair of pipes 21a,21b, each of the screws 15 should, as the first step, be unscrewed until the end wall 16 thereof is spaced apart from the top walls 29a of the ring 17, as shown in FIGS. 8a, 8b. Then, any one of the two pipes, for example the pipe 21b, is inserted into the second half section 11b of the coupling body 10, as shown in FIG. 8a, until the end wall 40 thereof is positioned very near to the internal annular flange 22 with a very narrow gap 41 therebetween, as shown in FIG. 8b. In order to easily confirm whether the pipe has been fully inserted to the proper position as shown in FIG. 8b, a suitable indicator, for example a groove 42 or a painted line (not shown), may preferably be formed beforehand with the external cylindrical walls 27a,27b of the pipes, so that, when the pipe is in the fully inserted position, the indicator 42 and one end wall 43 of the body 10 are in the same vertical plane, as shown in FIGS. 8b to 8d.

Preferably, the internal diameter of the two sections 11a,11b may be slightly greater than the external diameter of the two pipes 21a,21b, so that narrow cylindrical gaps 44a,44b,44c (FIGS. 7a to 7b, 8c, 8d) can be formed between the internal cylindrical walls of the sections 11a,11b and the external cylindrical walls 27a,27b of the pipes 21a,21b for the purpose to be hereinafter described.

As the pipe 21b is inserted into the coupling body 10, the sealing ring 30 is compressed and deformed so that the groove 13 is filled with the sealing ring 30 to produce a good sealing effect, as illustrated in FIGS. 8b to 8d.

Then, when each of the screws 15 is fully screwed up, the screw end 16 is pressed against the top wall 29a (FIGS. 8a, 8b) of the clamping ring 17 thereby to make the ring 17 slightly deformed from the position of FIG. 8b into that of FIGS. 8c, 8d to produce the annular gap 28 between the wall 24 of the groove 12 and the inclined wall 29b of the ring 17, while the sharp edges 19a,19b are strongly engaged with the V-shaped grooves 20a,20b. After the operation with the pipe 21b is finished in this way, the same operation should be carried out with the other pipe 21a. Thus, a firm interconnection between the pipe coupling and the jointed pipes can be established to a desired extent.

In operation, in the case where transversal oscillations are applied to the jointed pipes 21a,21b, such oscillations can be easily absorbed to a certain extent by slight rocking motions of the pipes about the fulcrum 29a. The rocking motions can be effected because the depressing members 15 are in point- or line-contact at 29a (FIG. 8c) with the outer circumferential wall of the ring 17 and because there exist the cylindrical gaps 44a,44b, 44c between the internal cylindrical wall of the body 10 and the external cylindrical walls of the pipes 21a,21 and also the gap 41 between the end walls 40 of the pipes and the radially inwardly extending walls 22a,22b (FIG. 8b) of the flange 22.

In the case when a twisting or circumferential force is applied to one of the pipes 21a,21b relative to the coupling body 10, there occurs a relative slipping motion between the screw end wall 16 and the outer circumferential wall 29a of the ring 17 because the walls 16 and 29a are merely in point- or line-contact with each other, resulting in that damage to the pipe by the applied twisting force can be prevented.

Resistance to an internal or external force applied axially of the pipe can be adjusted by giving an adjusted turn to each adjusting screw 15. However, when a considerably great axial force is applied to the pipe for instance in the direction of an arrow P as shown in FIGS. 7b and 7c with the result that the pipe 21a is forced to move axially outwardly until the inclined wall 29b of the clamping ring 17 comes into abutting contact with the tapered wall 25 of the body 10 as illustrated in FIGS. 7b, 7c, further axially outward movement of the pipe 21a can be prevented because the sharp edges 19a,19b are forced into more and more tight engagement with the V-shaped grooves 20a,20b as the inclined wall 29b is depressed down by the tapered wall 25.

In case the reverse axial force indicated by an arrow Q is applied to the pipe 21a in the position of FIG. 7b, an excessive axially inward movement of the pipe can be restricted because the end wall 40 of the pipe 21a come into abutting contact with the wall 22a of the annular flange 22 and because one end 45 (FIG. 7b) of the ring 17 also comes into contact with the innermost wall 23 of the body 10.

When the pressurised fluid flows through the passages 41, 44c, 37, into the cavity 31 of the deformable sealing ring 30, the fluid pressure acting upon the sealing lips 33, 34 urges the lips into tight sealing engagement with the wall 36 of the body 10 and the outer cylindrical wall 27a or 27b of the pipes, resulting in that a good sealing effect can be obtained.

FIG. 9 illustrates another embodiment of the pipe coupling 10' according to the present invention, in which the afore-described specific construction of the half sections 11a,11b of the coupling body 10 is utilized in combination with a known construction of flanged type coupling section 46 which comprises a pair of opposed flanges 47, 48 and a plurality of clamping bolts 49. As illustrated, only one of the two half sections is mounted on one pipe 21a' while the known coupling device 46 is mounted conventionally to the other pipe 21b' which extends transversely of the pipe 21a'.

The present invention being thus described, it will be obvious that same may be varied in many ways. For example, the specific construction of the afore-described half section of the coupling body may be utilized to a elbow type pipe coupling (elbow joint) and a so-called T-shaped type pipe coupling (T-joint). Such variations should not be regarded as a departure from the spirit and scope of the present invention, and all such modifications as would be obvious to one skilled in the art are intended to be included within the scope of the following claims.

I claim:
1. A pipe coupling comprising:
   a coupling body having at least two sections, at least one of which is of substantially cylindrical form with an opening mouth and includes a first and a second internal annular grooves;
   said first internal annular groove being defined by an innermost annular wall which extends sutstantially transversely of a longitudinal axis of said one section in which said first internal annular groove is formed and is disposed axially innermost of said one section, and an outermost annular wall which is tapered down toward said opening mouth and disposed outermost of said one section, and an intermediate annular wall which is of substantially arcuate profile in cross section and interposed between said innermost wall and said outermost wall;
   a split clamping ring made of elastic metal and disposed in said first internal annular groove so as to be slightly displaceable axially of said one section and relatively to said first internal annular groove;
   said clamping ring being of substantially arcuate configuration in cross section and having a pair of spaced circular sharp edges directed radially inwardly thereof;
   a deformable sealing ring disposed in said second internal annular groove; and
   adjustable depressing means provided for adjustably compressing said clamping ring diametrically;
   axial displacement of said coupling body relative to said clamping ring engages said arcuate configuration of said clamping ring with said tapered outermost annular wall for forcing said split clamping ring radially inwardly.

2. The pipe coupling as defined in claim 1, wherein
   said coupling body is of substantially cylindrical form having a first half section and a second half section connected together, and
   each of said first and second half sections comprises said first and second internal annular grooves, said split clamping ring, said deformable sealing ring, and said adjustable depressing means.

3. The pipe coupling as defined in claim 2, which includes
   an internal annular flange serving as a stopper means which extends radially inwardly of said coupling body.

4. The pipe coupling as defined in claim 1, wherein said outermost annular wall is tapered at an angle between 20° to 40°, preferably 30°.

5. The pipe coupling as defined in claims 1 or 2, wherein
   said split clamping ring is of substantially inverted-V-shaped configuration in cross section and has a pair of spaced circular sharp edges directed radially inwardly thereof.

6. The pipe coupling as defined in claims 1 or 2, wherein
   said adjustable depressing means comprises a plurality of threaded holes each extending radially inwardly of said coupling body to intercommunicate with said first internal annular groove, and a plurality of screws, preferably hexagon socket head screws, adjustably engaged with said threaded holes.

7. The pipe coupling as defined in claim 6, wherein a bottom end wall of each of said screws is substantially in point- or line-contact with a top wall of said clamping ring when the screw has been fully screwed up.

8. The pipe coupling as defined in claims 1 or 2, wherein
   said deformable sealing ring comprises an annular cavity having an opening directed axially inwardly of said coupling body, an outer and an inner lips defining said cavity, and an internal circumferential wall which is tapered and bulged out of said second internal annular groove when the deformable sealing ring is not in sealing position, and
   said inner lip includes an annular wall which extends substantially transversely of said longitudinal axis and is spaced apart from an innermost annular wall of said second internal annular groove for providing a fluid passage therebetween.

9. The pipe coupling as defined in claim 8, wherein at least one annular rib is formed with said internal circumferential wall of the deformable sealing ring.

* * * * *